(12) United States Patent
Brock-Nannestad et al.

(10) Patent No.: US 10,343,339 B2
(45) Date of Patent: Jul. 9, 2019

(54) LASER WELDING PLASTIC

(71) Applicant: Københavns Universitet, Copenhagen (DK)

(72) Inventors: Theis Brock-Nannestad, Copenhagen (DK); Michael Pittelkow, Copenhagen (DK); Helle Østergren Bak, Bagsværd (DK)

(73) Assignee: Københavns Universitet, Copenhagen (DK)

(*) Notice: Subject to any disclaimer, the term of this patent is extended or adjusted under 35 U.S.C. 154(b) by 279 days.

(21) Appl. No.: 14/784,024

(22) PCT Filed: Apr. 11, 2014

(86) PCT No.: PCT/DK2014/050096
§ 371 (c)(1),
(2) Date: Oct. 12, 2015

(87) PCT Pub. No.: WO2014/166506
PCT Pub. Date: Oct. 16, 2014

(65) Prior Publication Data
US 2016/0059475 A1 Mar. 3, 2016

(30) Foreign Application Priority Data

Apr. 11, 2013 (DK) .................................. 2013 00216
Apr. 11, 2013 (DK) .................................. 2013 00217

(51) Int. Cl.
B29C 65/14 (2006.01)
B29C 65/16 (2006.01)
(Continued)

(52) U.S. Cl.
CPC ...... B29C 65/1477 (2013.01); B29C 65/1616 (2013.01); B29C 65/1635 (2013.01);
(Continued)

(58) Field of Classification Search
CPC . B29C 65/16; B29C 65/1477; B29C 65/1616; B29C 65/1635; B29C 65/1658; B29C 65/1677; B20C 66/7392
See application file for complete search history.

(56) References Cited

U.S. PATENT DOCUMENTS

2006/0000812 A1* 1/2006 Weber .................... B23K 26/03
219/121.61

FOREIGN PATENT DOCUMENTS

WO          93/01941 A1     2/1993
WO     WO 9301941 A1 *     2/1993    .............. B41M 5/34
(Continued)

OTHER PUBLICATIONS

Hilton et al., "Laser Welding of Fabrics Using Infrared Absorbing Dyes", Proceedings from Joining of Advanced and Specialty Materials, Oct. 9-11, 2000, pp. 136-141.

Primary Examiner — Daniel McNally
(74) Attorney, Agent, or Firm — Knobbe Martens Olson and Bear, LLP

(57) ABSTRACT

The present invention discloses a method for laser welding of plastics, comprising the steps of providing a first plastic material to be welded comprising a compound capable of absorbing near-infrared light, positioning a second plastic material in intimate contact with the first plastic material, and activating a laser source emitting a wave length in the near-infrared spectrum to obtain attachments of the first and the second plastic material. The compound capable of absorbing near-infrared light is a dye derived from croconic acid.

9 Claims, 3 Drawing Sheets

(51) Int. Cl.
  *C09B 57/00* (2006.01)
  *C08K 5/00* (2006.01)
  *C08L 67/02* (2006.01)
  *B29C 65/00* (2006.01)
  *C09B 23/01* (2006.01)

(52) U.S. Cl.
  CPC ...... *B29C 65/1658* (2013.01); *B29C 65/1677* (2013.01); *B29C 66/7392* (2013.01); *C08K 5/0041* (2013.01); *C08L 67/02* (2013.01); *C09B 23/0066* (2013.01); *C09B 57/00* (2013.01); *B29C 66/1142* (2013.01); *B29C 66/43* (2013.01); *B29C 66/71* (2013.01); *B29C 66/73116* (2013.01); *B29C 66/73921* (2013.01); *B29K 2023/04* (2013.01); *B29K 2995/0018* (2013.01)

(56) References Cited

FOREIGN PATENT DOCUMENTS

| | | |
|---|---|---|
| WO | 00/20157 A1 | 4/2000 |
| WO | 2005/053935 A1 | 6/2005 |
| WO | WO 2005053935 A1 * | 6/2005 ......... B29C 65/1683 |
| WO | 2005/080066 A1 | 9/2005 |

* cited by examiner

LASER WELDING PLASTIC

CROSS-REFERENCE TO RELATED APPLICATIONS

This application is the U.S. National Phase under 35. U.S.C. § 371 of International Application PCT/DK2014/050096, filed Apr. 11, 2014, which claims priority to Danish Patent Application No. PA 2013 00216, filed Apr. 11, 2013 and Danish Patent Application No. PA 2013 00217, filed Apr. 11, 2013. The disclosures of the above-described applications are hereby incorporated by reference in their entirety.

The present invention relates to a method for laser welding of plastics and the use of croconic acid derivatives as a near-infra red absorbing compound in laser welding of plastic materials.

BACKGROUND

Laser welding of plastic is an important emerging industrial process that utilizes near-infrared (NIR) lasers to weld pieces of plastic together.

For use in industrial laser welding processes NIR pigments such as Carbon black, various metallated phthalocyanines and more recently differently substituted perylenes have been used. These classes of compounds are well-studied, chemically inert, heat resistant, and often relatively cheap to produce. However, they suffer from the disadvantage, that they are colored in the visible region, thus making them less ideal for the use in laser welding of colorless plastics. An issue with most of these dyes is their chemical stability; the stability leaves the plastic colored after the welding has been performed.

Specific examples of prior art publications include WO 2009/024497 disclosing a composition comprising titanium dioxide in the anatase form and a polymeric binder. The composition may also comprise tungsten suboxide, tungsten bronze, or mixtures of tungsten trioxide, tungsten bronze and metallic tungsten. The composition is used for forming a laser-sensitive coating layer on a substrate.

WO2009/059900 relates to the use of tungsten oxide or of tungstate to increase the heat-input amount of near infrared radiation in laser welding of plastics. Tungsten oxide to be using in the invention has the formula W03-x wherein W is tungsten, O is oxygen, and x is 0.1-1 and/or the use of tungstate of the formula MxWyOz wherein M is one or more element selected from NH4, H, Li, Na, K, Rb, Cs, Ca, Ba, Sr, Fe, Sn, Mo, Nb, Ta, Ni, Pd, Pt, Cu, Ag, Au, Zn, Cd, Al, Ga, In, Tl, W is tungsten, O is oxygen, 0.001<x/y<1, and 2.0<z/y<3.0, to increase the heat-input amount of near infrared radiation in the process of NIR curing of coatings and NIR drying of coatings.

WO 2010/046285 also relates to welding of plastic using a tungsten derivative. WO 2011/005631 relates to potassium cesium tungsten bronze solid solution particles, which are indicated to be NIR absorbers. The particles may be included in plastics.

WO 2009/010405 also discloses a laser-sensitive system. Preferably, the laser-sensitive system is selected from the group consisting of a salt of an acid and an amine or mixtures of salts of acids and amines, titanium dioxide, an oxygen containing transition metal salt, a compound containing a free carbonyl group and a nucleophile or a compound containing a free carbonyl group, which compound is substituted with one or more nucleophilic groups, a compound having functional groups and a metal compound or an acid, and a color former and a color developer or a latent color developer which generates a color developer upon activation, preferably a color former and a latent color developer.

WO 2007/114829 discloses a coating composition comprising a mark formation layer, which contains an electron donor dye precursor micro-encapsulated within a polymer of a specific Tg range, and an electron acceptor compound which can react with the electron donor dye to turn it into a dye.

Dyes that are used as laser absorber dyes should fulfill certain requirements. The dye must have a strong absorption at the wavelength of the used laser, it should be sufficiently heat resistant to resist the treatment during compounding and neither the dye nor the decomposition products should be toxic if used together with foodstuff etc.

The present invention provides laser absorbing dyes, which in addition to the above requirements, also are almost colorless in the visible area. A colorless laser absorbing dye may provide for almost invisible sealing of transparent plastic elements to each other. In a preferred embodiment the laser absorbing dyes for plastic laser welding is colorless in the visible region and absorbs intensely in the NIR region, where the laser of choice emits. Furthermore, the present invention provides in a preferred embodiment that the NIR absorption of the dye is transmitted to the surroundings in the form of heat, thus causing the welding to occur. The NIR absorber of the present invention for laser welding of plastic does not, or only to a limited extent, releases its energy via other pathways than heat, such as fluorescence.

SUMMARY OF THE INVENTION

The present invention relates to a method for laser welding of plastics, comprising the steps of
a) providing a first plastic material to be welded comprising a compound capable of absorbing near-infrared light,
b) positioning a second plastic material in intimate contact with the first plastic material, and
c) activating a laser source emitting a wave length in the near-infrared spectrum to obtain attachments of the first and the second plastic material,
wherein the compound is a derivative of croconic acid having the general formula

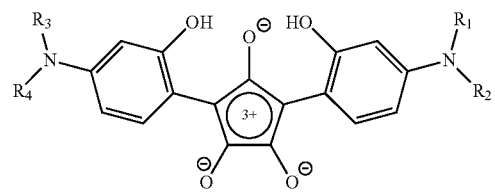

where the functional groups R1, R2, R3, and R4 independently represent alkyl having 1 to 20 carbon atoms.

In the present invention with claims, the terms "derivative of croconic acid", "croconic acid derivative", "croconaine dye", "absorber", "NIR absorber", or "dye" are used interchangeably to denote a compound of the above general formula.

The specific choice of aromatic substituent is dependent of the wavelength for which the croconaine dye is optimized. For fine-tuning of the optical absorptive properties or the physical chemical properties even asymmetric dyes can be synthesized, which is dyes where the fictionalization of the two aryl groups are different.

It will be appreciated, that the aryl groups can be functionalized to impart specific properties, such as compatibility with a specific polymer towards the dye. This can be done through the use of specific groups where the functional groups $R_1$, $R_2$, $R_3$ and $R_4$ are alkyl having 1 to 20 carbon atoms. In a certain aspect of the present invention, at least one of the functional groups $R_1$, $R_2$, $R_3$ and $R_4$ is alkyl having 4 to 20 carbon atoms.

After absorption of the laser light by the first plastic material the energy is converted into heat and the heat is subsequently dispersed into the second plastic material. The energy is absorbed either as surface or volume absorption and melts the plastic. The heat of the first plastic material is transferred to the second plastic material by heat transduction.

In accordance with the present invention, the first and the second plastic material may be of the same type and grade or a different type and grade dependent on desired end-product. In an embodiment of the present invention the first and the second plastic material at a certain temperature have overlapping melting intervals. Several factors influence how weldable two plastics are, one factor being the type of plastics. Generally, two plastics can be welded if they have overlapping melting intervals and are miscible.

Plastics contain a polymer and also several different additives that influence mechanical and aesthetic properties. The melting intervals of a plastic material may be changed by adjusting the type and amount of additives.

The efficiency of transduction of heat to the laser transparent plastic depends on a sufficient contact in the interface, because heat is best conducted where there is contact. Therefore, the present invention may be favorably be practiced by providing external mechanical pressure in step c. If the contact is poor it is necessary to heat the laser absorbing plastic to a higher temperature to obtain a weld, increasing the risk of decomposition.

In another aspect, the invention relates to croconic acid derivatives of the general formula

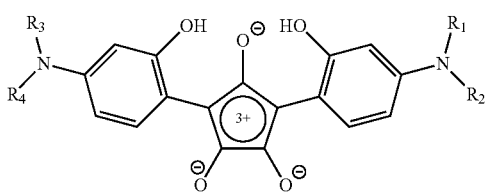

as a near-infra red absorbing compound in laser welding of plastic materials, where the functional groups R1, R2, R3 and R4 independently represent alkyl having 1 to 20 carbon atoms.

Suitably, the croconic acid derivatives are used as near-infra red absorbing compounds, where the compound or compounds are admixed with the plastic materials.

In a certain aspect of the invention the near-infra red absorbing compound is dispersed in a plastic material imbued with a dye having its major absorbance in the visible part of the spectrum, thus imparting laser-weldability on said plastic material, without significantly changing its visual appearance.

DETAILED DESCRIPTION OF THE INVENTION

Figure 1:
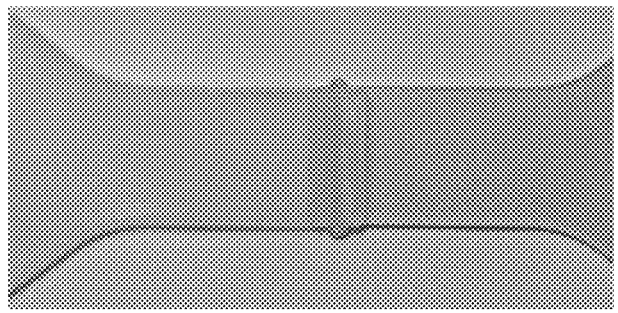
FIG. 1. is an image of the weld formed.
Figure 2:
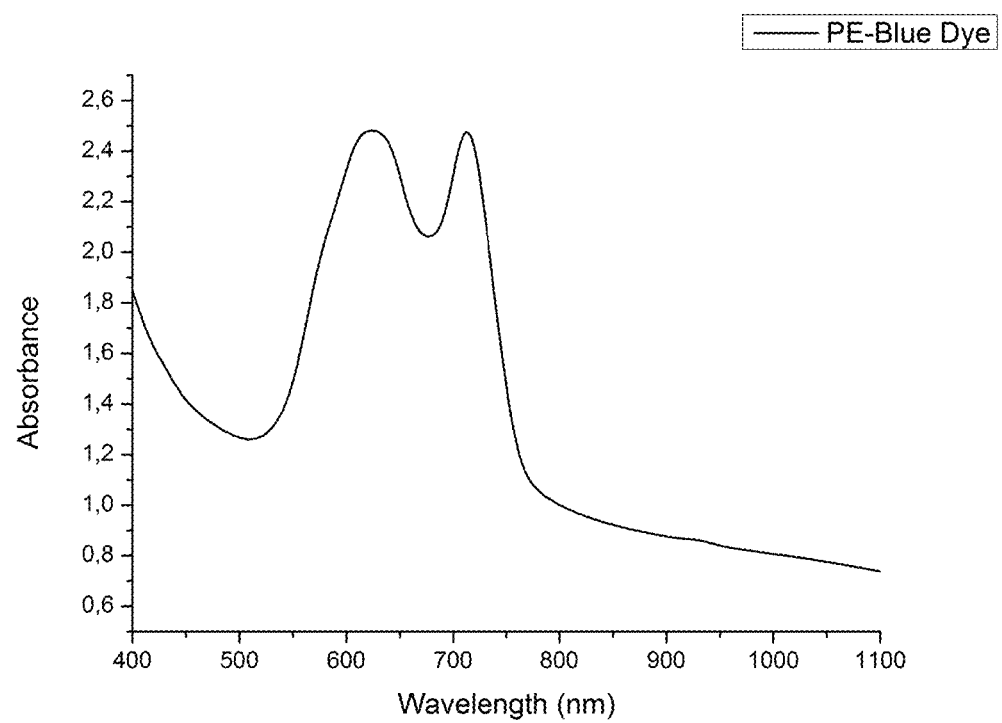
FIG. 2. is a chart of the absorbance spectrum of polyethylene imbued with blue dye.
Figure 3:
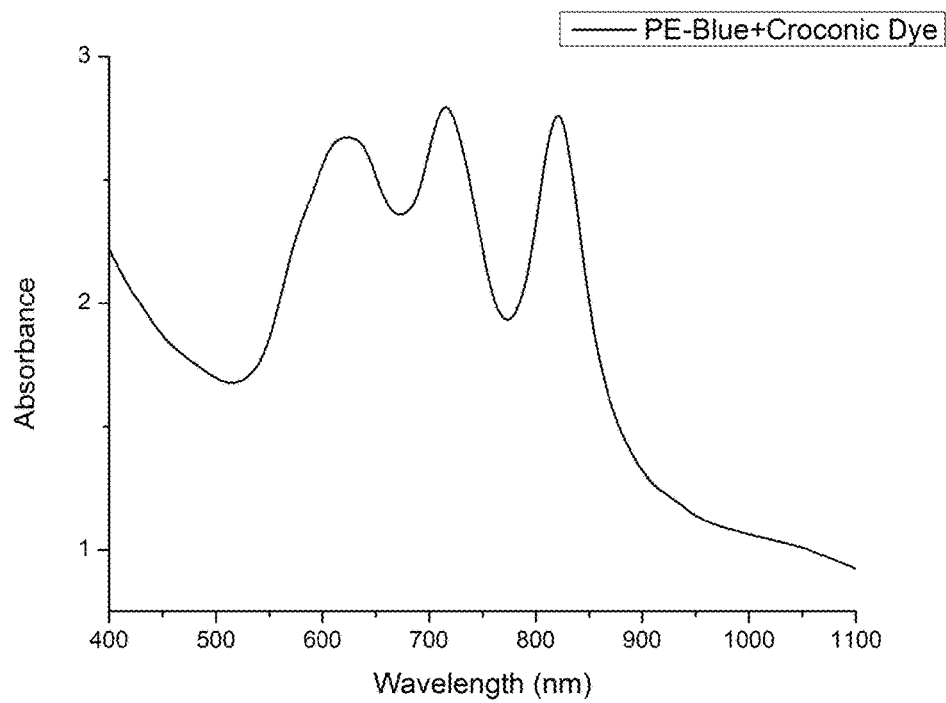
FIG. 3. is a chart of the absorbance spectrum of polyethylene imbued with blue dye plus croconic dye.
Figure 4:
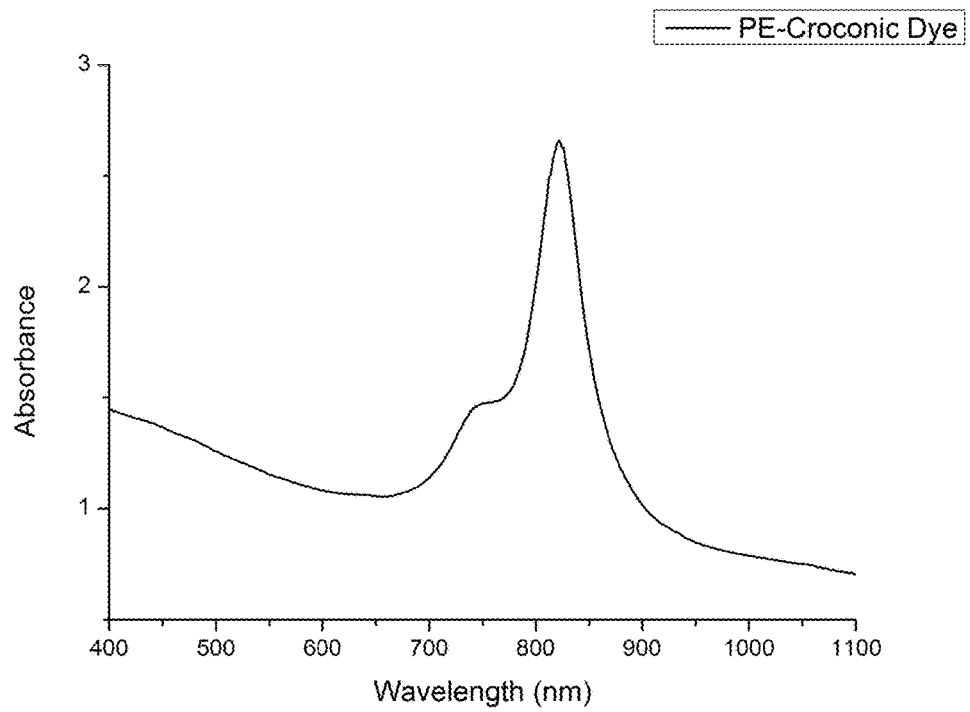
FIG. 4. is a chart of the absorbance spectrum of polyethylene imbued with croconic dye.
Figure 5:
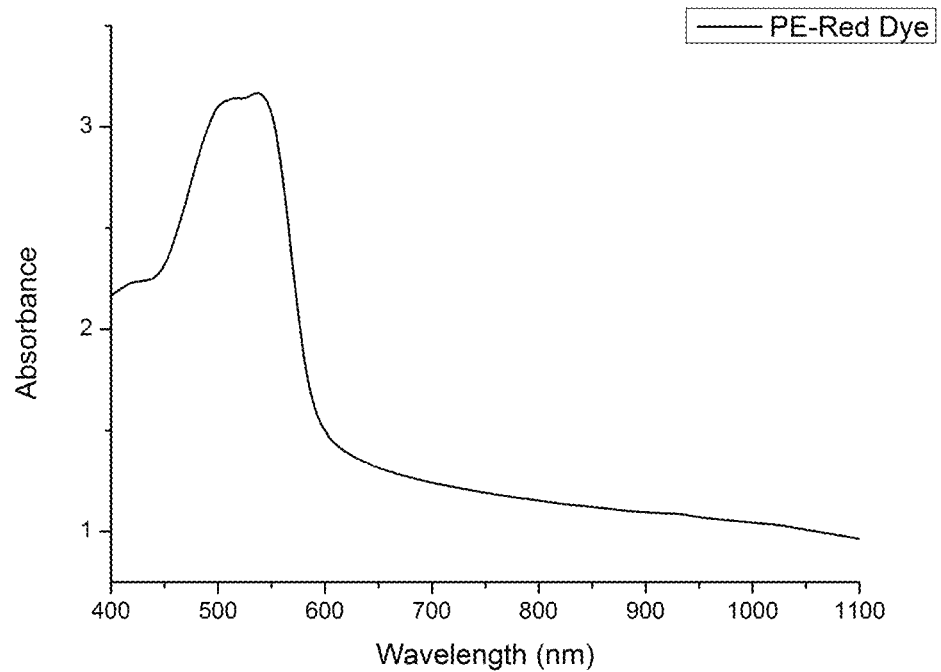
FIG. 5. is a chart of the absorbance spectrum of polyethylene imbued with red dye.
Figure 6:
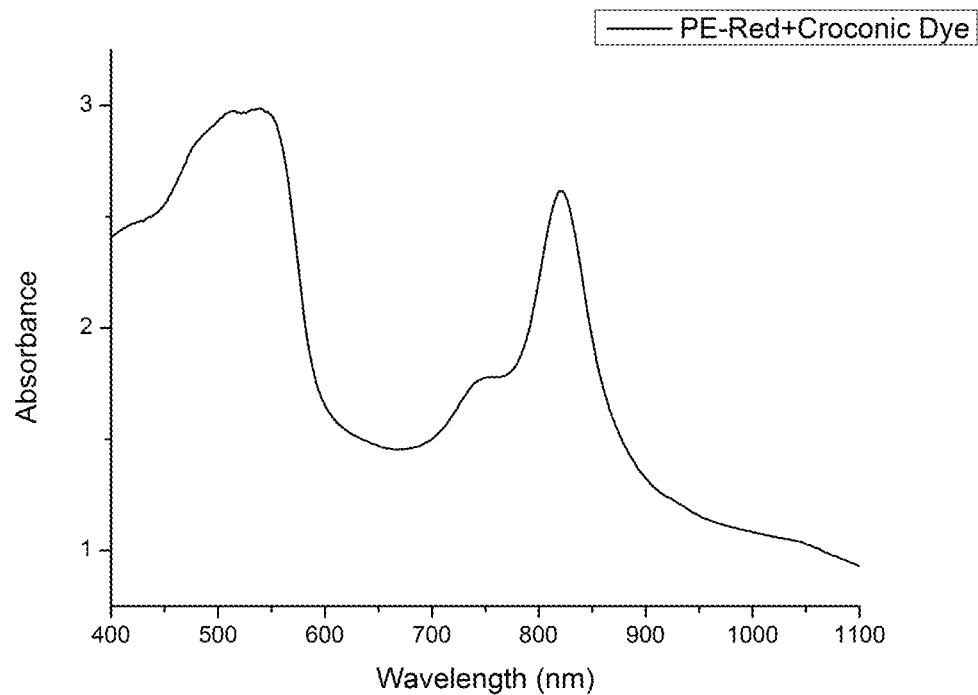
FIG. 6. is a chart of the absorbance spectrum of polyethylene imbued with red dye plus croconic dye.

Croconaine dyes have a strong and sharp absorption in the near-infrared (NIR) region. Compared to other dyes with a sharp absorption in NIR we have found that they can be synthesized in few steps. Furthermore, the crocanaine dyes are easy to adapt to the specific plastic material used because changing the substituents on the amine nitrogen can easily modify the solubility. While the selection of aromatic or hetero-aromatic group can tune the overall absorption profile of the dye, the choice of substituent can provided physical chemical properties needed for efficient use in laser welding applications.

Laser welding of plastic is typically achieved by incorporating a near-infrared absorber into one of the two pieces of plastic one wish to weld together. The two pieces of plastic are placed on top of each other and laser irradiation using a laser with a wavelength that corresponds to the absorption of the NIR absorber is performed. Laser welding provides a convenient way to make very narrow welding zones as compared to other types of welding procedures.

According to the present invention the croconic acid derivative is preferably present admixed with the plastic material. In certain applications it may however, be advantageously to have the croconic acid derivative deposited on the surface between the parts to be joined by laser welding. It is desirable to have the NIR absorber evenly distributed in the plastic to ensure a smooth welding zone. The even distribution may be achieved by preparing NIR absorbers that are soluble in the type of plastic one wish to weld. One strategy to achieve high solubility of organic absorbers in very non-polar solvents, and also to very non-polar polymers such as polyethylene and polypropylene, is to append long alkyl chains to the absorber.

Several factors influence how weldable two plastics are, one factor is the type of plastics. Examples of suitable plastic materials for the present invention includes ABS (acrylonitrile-butadiene-styrene-copolymer), ASA (acrylonitrile-styrene-acrylate-copolymer), MABS (methyl methacrylate-acrylonitrile-butadiene-styrene-copolymer), PA-6 (polyamide-6), PA-6.6 (polyamide-6.6), PA-12 (polyamide-12), PBT (polybutylene terephthalate), PBT/ASA (polybutylene terephthalate/acrylonitrile-styrene-acrylate-blends), PC (polycarbonate), PC/ABS (polycarbonate/acrylonitrile-butadiene-styrene-blends), LDPE (low density-polyethylene), HDPE (high density-polyethylene), PEEK (poly ether ketone), PES (polyethersulfone), PET (polyethylene terephthalate), PMMA (poly(methyl methacrylate)), POM (polyoxy methylene), PP (polypropylene), PPS (poly(p-phenylene sulfide), PS (polystyrene), PSU (polysulfone), PVC (polyvinylchloride), SAN (styrene-acrylonitrile-copolymer).

Generally, two plastics can be welded if they are miscible and have overlapping melting intervals. Plastics contain a polymer and also several different additives that influence mechanical and aesthetic properties. The additives also influence other characteristics of the plastic, such as the transmittance.

When preparing plastics different additives are added to the polymer to obtain the desired characteristics of the plastic. An even distribution of the different additives is advantageous to obtain the required properties. This is particularly important for additives in low concentrations, like laser absorbers. The additives are typically mixed with the polymer in an extruder; the polymer is melted and is mixed with the additives. The melted polymer with admixed additive may be used directly in the formation of the first plastic material used in the present invention or plastic is divided into small pellets ready for further processing.

Different laser welding techniques can be used for welding. The most common is through-transmission laser welding (TTLW) another method is Butt-Joint welding. The basic principle in TTLW is to use laser light to join a laser transparent and a laser absorbing plastic. The laser light is transmitted through the laser-transparent plastic to the laser-absorbing plastic. The absorbing plastic converts the laser energy into heat and the polymers melt. In the contact surface between the absorbing and transparent plastic heat is transferred to the transparent plastic by heat conduction and the transparent plastic melts. If the absorber is deposited on the surface, by surface coating the energy will be transferred to both plastics.

In Butt-Joint welding the principle is joining of parallel surfaces of two components. The laser light interacts with the surface of the two plastics parallel to the contact interface. Depending on the choice of laser and the optical properties of the material the energy is absorbed into the surface, if the entire laser light is absorbed close to the surface. Alternatively the laser light is absorbed by volume absorption, if the light transmits further into the plastic.

Absorption of laser light and generation of heat can be divided into two different interaction processes, direct absorption and indirect absorption. In direct absorption the macromolecules of the plastic materials absorbs the energy from the laser light, resulting in oscillations in the macromolecules. Direct absorption can be obtained with laser light with wavelengths above 1200 nm, corresponding to frequencies below 8300 $cm^{-1}$. Plastics are rather transparent to laser light between 800 and 1200 nm. With addition of laser absorbers to the plastic indirect absorption is obtained. The laser absorber converts the energy from the laser light into heat that is transferred into the polymer.

By heating with laser light in the absorbing plastic and heat flow into the transparent plastic, the contact interface of both plastics exceeds the melting temperature. The plastics changes from a solid into the molten state, in which the mobility of the polymers are increased. With increasing temperature the specific volume of the plastic is increased. It will generate an increased internal pressure between both molten interfaces. By applying external mechanical pressure to fix the plastics, macromolecules at each interface will penetrate into the other and will form the weld joint after re-solidification.

Different effects appear to contribute to the generation of the weld. The first effect is inter-diffusion process according to which segments of the macromolecular chain below the melting temperature can move caused by Brown's micro mobility, but the mobility is restricted in a "cage" consisting of the other macromolecules. By exceeding the melting temperature segments of the macromolecular chain can leave the "cage" induced by Brown's micro mobility. At the interface between two molten layers macromolecular chain segments can step out of the surface of the layer and diffuse into the second layer. The extent of diffusion is a function of temperature.

The melting process is accompanied by an increase in volume, and with applied external pressure the molten areas will begin to squeeze into the free spaces between both layers. Macromolecules with parallel orientation to the interface surface will be stretched in the molten state along the squeeze flow direction, parallel to the interface. In the beginning of the re-solidification, the stretched macromolecules are subjected to relaxation process and they try to return to their original structure. Semi-crystalline plastics can, beside the two already mentioned effects for amorphous plastics, generate mixed crystalline phases in the re-solidification process.

TTLW is the most common applied process for industrial application of laser welding of plastics. The process is basically used in three different modifications as contour welding, quasi-simultaneous welding and simultaneous welding. Contour welding is characterized with a single laser beam is moved along the joint path on the plastic. The line energy, $E_S$, quantifies the energy applied to the plastic in the laser welding process. The laser power and welding speed can be changed, if the line energy is identical, will the weld have similar quality.

The laser absorber is suitably in the polymer with the highest melting temperature if two different types of plastic are welded because the highest temperature is obtained in the plastic with the laser absorber. The laser transparent plastic is heated by transduction of heat from the laser absorbing plastic.

When welding two plastic materials they have to be compatible with each other. The materials properties, which have influence on the compatibility, include:

Chemical structure—polymeric molecules have to be miscible between each other.

Thermal properties—the melt temperature ranges should overlap, heat expansion coefficients should be of the same order.

Surface energetic properties—the polar surface energy should be of the same order.

Rheological properties—the melt-flow index should be of the same order.

If the plastic materials used in the first and the second plastic material are different from each other the compatibility needs to be examined. The table below, prepared R. Klein, *Laser Welding of Plastics*, Wiley-VCH, 2012, illustrates compatibilities between plastic materials. The table illustrates tested combinations of plastics and their weldability, in which the dark grey marks the strong welds, the pale grey marks combinations, which are weldable but not strong welding, whereas the blank marks incompatible combinations under the test conditions used. It should be kept in mind however, that the solubility of the various polymer materials may be changed by addition of additives. Therefore, a blank combination should not necessarily be understood as indicating that adherence is impossible in general.

TABLE 1

ABS (acrylonitrile-butadiene-styrene-copolymer), ASA (acrylonitrile-styrene-acrylate-copolymer), MABS (methyl methacrylate-acrylonitrile-butadiene-styrene-copolymer), PA-6 (polyamide-6), PA-6.6 (polyamide-6.6), PA-12 (polyamide-12), PBT (polybutylene terephthalate), PBT/ASA (polybutylene terephthalate/acrylonitrile-styrene-acrylate-blends), PC (polycarbonate), PC/ABS (polycarbonate/acrylonitrile-butadiene-styrene-blends), LDPE (low density-polyethylene), HDPE (high density-polyethylene), PEEK (poly ether ketone), PES (polyethersulfone), PET (polyethylene terephthalate), PMMA (poly(methyl methacrylate)), POM (polyoxy methylene), PP (polypropylene), PPS (poly(p-phenylenesulfide), PS (polystyrene), PSU (polysulfone), PVC (polyvinylchloride), SAN (styrene-acrylonitrile-copolymer).

A good weld is often characterized when breakage occurs in the plastic before the weld is broken in a pull-test. Strong welds are as a general seen between plastics with similar characteristics.

Laser absorbers are added in low concentrations, typically 1% for inorganic absorbers and 0.01% for organic absorbers. Inorganic additives like carbon black are dispersed in the plastic and typical have particle sizes between 0.5 and 1 μm. Organic dyes, like azo or perylene dyes are dissolved, with a typical size between 0.01 and 0.1 μm. Both inorganic and organic dyes can absorb the laser radiation and transfer the laser energy into process-heat. Because organic dyes may be more homogeneously distributed and the direct contact to the macromolecular chains is better, the heat transfer is more effective compared to inorganic dyes. This is also the reason for the smaller amount organic dye necessary.

Dyes must have some special characteristics for being suitable as laser absorber. Croconaine dyes have several of these characteristics. They have their absorption maxima at about 800 nm or higher suitable for the relative inexpensive 808 nm diode lasers. The croconain dyes may also be fine-tuned so that other lasers at even longer wavelength may be used. The molar absorbance coefficient is in the order 10E5 $M^{-1} \cdot cm^{-1}$, a high molar absorbance coefficient is important to keep the concentration in the polymer low. The solubility can easily by modified by changing the substituents on the nitrogen atoms of the anilins, in order to optimize the solubility in different polymers, like PE and PP. Several croconaine dyes have little absorption in the visible area and can be used in plastic transparent in the NIR region of the spectrum. For colorless polymers, only imbued with croconaine dye, one can bleach the plastic after welding. Exposure to light from e.g. a xenon or mercury arc lamp leads to colorless decomposition products of the croconaine dye.

Croconaine dyes can be synthesized in few steps with reasonably good yields. This is important for a commercial perspective to produce the laser absorbers at low costs. Toxicity is another important criterion for some applications, as diffusion in the plastic will bring the croconaine dye in contact with the consumer, goods, or foodstuff. There are no reports with analysis of the toxicity of neither croconaine dyes nor its decomposition products. Compared to other NIR absorbers that contain large aromatic systems, the expected risk of toxicity is low.

While the chemical compounds of the present invention have been described in a single resonance form, it will be understood by the person skilled in the art that croconic acid derivatives may be present in various resonance forms. In scheme 1 below is illustrated the resonance forms for a specific example.

Scheme 1

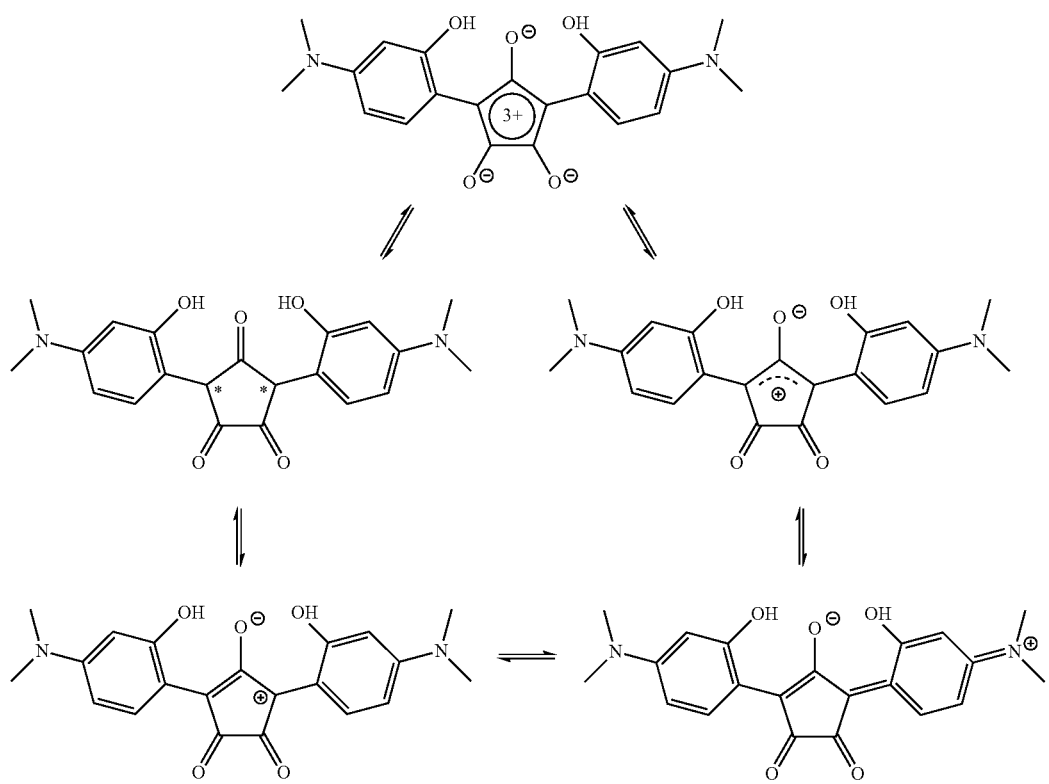

In a further aspect, the croconaine dyes of the invention have the generic structures illustrated below.

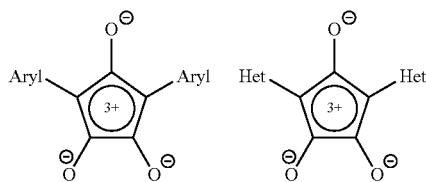

It will be appreciated that the two structures are identical save for the indication of the aromatic or heteroaromatic nature of the substituents—as a visual aid for the reader.

The specific choice of aromatic substituent and the substitution of said substituent(s) are dependent of the wavelength for which the croconaine dye is optimized. For fine-tuning of the optical absorptive properties or the physical chemical properties even asymmetric dyes can be synthesized, which is dyes where the functionalization of the two aryl- or heteroaromatic-groups is different, or indeed where one group is heteroaromatic (Het) and the other group is aromatic (Aryl). Aryl can be aromatic rings such as benzene, naphthalene, anthracene, pyrene and the like, and Het may be a heteroaromatic ring such as furan, pyrrole, thiophene, selenophene, pyridine, chinoline, and the like, where the aromatic or heteroaromatic rings can each be substituted with dialkylated amino-groups where the alkyl chains can each be 1 to 20 carbon atoms in size.

EXAMPLES

Example 1: Production of 2,5-bis[4-(N,N'-didecylamino)-2-hydroxyphenyl]-croconaine Dye Croconaine dyes of the invention can, as a non-limiting example, be synthesized by the reaction illustrated below, where it should be noted, that there is some leeway in the selection of solvents. Accordingly, other alcohols than 1-butanol can be used, and co-solvents other than toluene, such as benzene, cyclohexane or xylenes can be utilized, depending on the ability to form azeotropes with water and the reaction temperature selected.

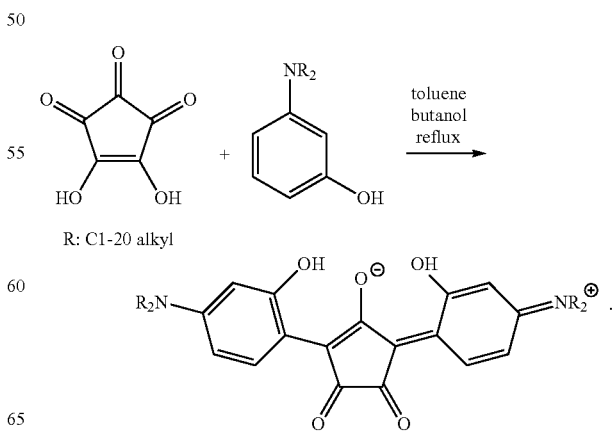

Step 1: Production of 3-(N,N'-didecanylamino)phenol

3-Aminophenol (5.00 g, 45.8 mmol) and $Na_2CO_3$ (6.75 g, 64.85 mmol) were added to isopropanol (40 ml) in a round bottomed flask while stirring. The mixture was stirred for 30 minutes, and iodododecane (24.55 g, 91.6 mmol) was added drop wise to the solution over a period of 30 minutes. The reaction mixture was heated to reflux overnight. The mixture was cooled to room temperature, and water (30 ml) was added, followed by extraction with $CH_2Cl_2$ (3·75 ml). The organic phases were collected, dried with $Na_2SO_4$, and the solvent evaporated in vacuo. The product was isolated by dry vacuum column chromatography with heptane:ethylacetate.

Yield: 12.6 g (32.3 mmol) 71% as a purple oil $^{1H}$ NMR (500 MHz, DMSO) δ 8.86 (s, 1H), 6.86 (t, J=8.1 Hz, 1H), 6.05-5.94 (m, 2H), 5.75 (s, 1H), 3.14 (t, J=7.5 Hz, 4H), 1.47 (s, 4H), 1.24 (m, 28H), 0.85 (t, J=6.9 Hz, 6H).

$^{13C}$ NMR (126 MHz, DMSO) δ 158.2, 149.1, 129.4, 102.8, 102.5, 98.6, 50.3, 31.3, 29.1, 29.0, 28.9, 28.7, 26.9, 26.5, 22.1, 13.8.

Step 2: Production of 2,5-bis[4-(N,N'-didecylamino)-2-hydroxyphenyl]-croconaine Dye Into a 250 ml round-bottomed flask equipped with a Dean-Stark condenser, magnetic stirrer, and nitrogen gas inlet, 3-(N,N'-didecanylanmino)phenol (2.725 g, 7.0 mmol) was added to □ a mixture of 1-butanol (30 ml) and toluene (70 ml). The solution was stirred until the 3-(N,N'-didecanylanmino)-phenol was completely dissolved. Croconic acid (497.5 mg, 3.5 mmol) was added to the solution. The reaction mixture was heated to reflux for 5 hours. The reaction mixture was rapidly cooled with ice, and the solvents where evaporated in vacuo, to give a brown-black solid. The crude product was purified by consecutive columns by flash chromatography with ethylacetate:heptane (1:5) followed THF:Heptane (1:4) as eluents.

Yield: 0.84 g (0.95 mmol) 27% as a purple/black solid.

$^{1H}$ NMR (500 MHz, CDCl3) δ 14.08 (s, 2H), 8.97 (s, 2H), 6.38 (d, J=9.9 Hz, 2H), 6.05 (s, 2H), 3.36 (d, J=7.8 Hz, 8H), 1.60 (d, J=14.2 Hz, 8H), 1.24 (broad signal, 56H), 0.82 (t, J=6.4 Hz, 12H).

MS (MALDI-TOF) m/z=886.021 [M] (calculated for $C_{57}H_{92}N_2O_5$: m/z=884.70).

HR MS m/z=885.7062 [M+H]+(calculated for $C_{57}H_{93}N_2O_5^+$ m/z=885.7079).

Example 2: Preparation of 2,5-Bis[4-(N,N'-diethylamino)-2-hydroxyphenyl]-croconaine Dye 3-(Diethylamino)phenol (1.19 g, 7.2 mmol) and croconic acid (0.49 g, 3.5 mmol) were suspended in butanol (25 ml) and toluene (25 ml) and heated to reflux for 10 minutes. The solvent was removed in vacuo. The crude mixture was purified on a flash column using THF as eluent. The solvent was evaporated in vacuo. Isolated as a brown solid.

$^{1H}$ NMR (500 MHz, CDCl3+DMSO) δ 9.96 (d, 2H), 6.53 (dd, 2H), 6.10 (d, 2H), 3.55 (q, J=7.2 Hz, 8H), 1.25 (t, J=11.6, 7.4 Hz, 12H).

$^{13C}$ NMR was not obtained due to poor solubility. □MS (LC-MS) m/z=437.2 [M] (calculated for $C_{25}H_{29}N_2O_5$: m/z=437.2) □HR MS m/z=437.2071 [M+H]+(calculated for $C_{25}H_{29}N_2O_5$: m/z=437.2071).

Example 3: Welding of Polyethylene Compounded with 2,5-bis[4-(N,N'-didecylamino)-2-hydroxyphenyl]-croconaine Dye with a 808 nm Diode Laser The PE compounded with croconaine dye has successfully been welded with PE. The plastic was welded with a 300 W, 808 nm Laserline diode laser. The plastics were held together with pressure from a glass plate. A strong welding was obtained with 100 W and a welding speed of 100 mm/s. The weld formed is shown in FIG. 1.

Example 4: Variation in the Spectroscopic Properties in Dependence on Solvent

| | $E_T30$ (kcal/mol) | Absorbance maxima (nm) | Molar absorbance coefficient ($M^{-1} \cdot cm^{-1}$) |
| --- | --- | --- | --- |
| N-methylformamide | 54.1 | 836 | 36300 |
| Ethanol | 51.9 | 825 | 190000 |
| Acetonitrile | 45.6 | 824 | 168500 |
| Dichloromethane | 40.7 | 832 | 221200 |
| Chloroform | 39.1 | 833 | 232600 |
| Tetrahydrofuran | 37.4 | 826 | 230000 |
| Benzene | 34.3 | 830 | 253200 |
| Hexane | 31.0 | 809 | 229800 |

Table 2. shows the spectroscopic properties of 2,5-bis[4-(N,N'-didecylamino)-2-hydroxyphenyl]-croconaine dye in a selection of solvent.

Example 5: Welding of Imbued Plastic

Welds of plastic samples imbued with croconic acid dye, as well as samples imbued with the combination of a commercially available plastic dye in combination with croconic acid dye was laser-welded using a solid state laser emitting at 808 nm. The croconic acid dye used was 2,5-bis[4-(N,N.-didecylamino)-2-hydroxyphenyl]-croconaine dye.

The laser used was a Coherent FAB-800 fiber coupled laser run at 15 W optical power, as determined by a Thorlabs laser power meter. The plastic pieces to be welded were held in place using a mechanical fixture, and the fixture and the plastic parts were placed on a programmable linear table, with the speed selectable up to 50 mm per second. Welds obtained showed good adhesion and strength.

Shown in FIGS. 2-6 is the absorbance spectra of polyethylene imbued with respectively the Blue dye, Red dye, Croconic dye, Blue dye plus Croconic dye and lastly Red dye plus Croconic dye. The spectra were determined with a Perkin-Elmer Lambda 40 spectrometer, scanning from 1100 nm to 400 nm. As can be seen from the figures neither the Blue dye nor the Red dye in themselves have appreciable absorbance at 808 nm, while the Croconic dye as well as the combinations of Croconic dye and the Blue dye or Red Dye absorbs significantly at 808 nm.

What is claimed is:

1. A method for laser welding of plastics, the method comprising:
   a) providing a first plastic material to be welded comprising a compound capable of absorbing near-infrared light,
   b) positioning a second plastic material in intimate contact with the first plastic material, and c) activating a laser source emitting a wave length in the near-infrared spectrum to obtain attachments of the first and the second plastic material, wherein the compound is a derivative of croconic acid having the general formula

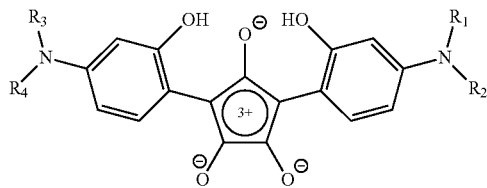

where the functional groups R1, R2, R3, and R4 represent alkyl having 10 to 20 carbon atoms, and wherein R1, R2, R3, and R4 are identical, or R1=R3 and R2=R4.

2. The method according to claim 1, wherein the first and the second plastic material at a certain temperature have overlapping melting intervals.

3. The method according to claim 2, wherein the first plastic material has a melting temperature above the melting temperature of the second plastic material.

4. The method according to claim 1, wherein external mechanical pressure is provided in step c.

5. The method according to claim 1, wherein R1, R2, R3, and R4 represent alkyls having 10 carbon atoms.

6. A near-infrared absorbing compound in laser welding of plastic materials comprising croconic acid derivatives of the general formula

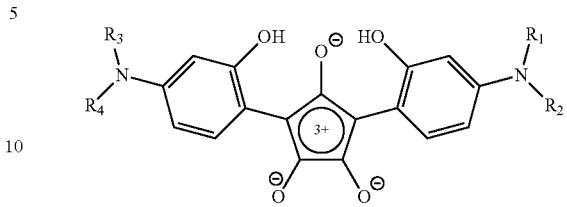

where the functional groups R1, R2, R3 and R4 represent alkyl having 10 to 20 carbon atoms, and wherein R1, R2, R3, and R4 are identical, or R1=R3 and R2=R4.

7. The near-infrared absorbing compound according to claim 6, wherein the compound is admixed with the plastic materials.

8. The near-infrared absorbing compound according to claim 6, wherein the near-infra red absorbing compound is dispersed in a plastic material imbued with a dye having its major absorbance in the visible part of the spectrum, thus imparting laser-weldability on said plastic material, without significantly changing its visual appearance.

9. The near-infrared absorbing compound according to claim 6, wherein R1, R2, R3, and R4 represent alkyls having 10 carbon atoms.

* * * * *